United States Patent [11] 3,545,428

[72] Inventor Wilton W. Webster, Jr.
 1388 Crest Drive, Altadena, California 91001
[21] Appl. No. 766,487
[22] Filed Oct. 10, 1968
[45] Patented Dec. 8, 1970
 Continuation-in-part of application Ser. No. 472,240, July 15, 1965, now Patent No. 3,405,708. This application Oct. 10, 1968, Ser. No. 766,487

[54] MASSFLOWMETER CATHETER
 12 Claims, 3 Drawing Figs.
[52] U.S. Cl. .................................................. 128/2.05, 73/204
[51] Int. Cl. .................................................. A61b 5/02
[50] Field of Search ...................................... 128/2.05, 2.1; 73/204

[56] References Cited
 UNITED STATES PATENTS

| | | | |
|---|---|---|---|
| 3,075,515 | 1/1963 | Richards | 128/2.05 |
| 3,359,974 | 12/1967 | Khalil | 128/2.05 |
| 3,405,708 | 10/1968 | Webster, Jr. | 128/2.05 |
| 3,438,253 | 4/1969 | Kuether et al. | 73/204 |
| 3,446,073 | 5/1969 | Auphan et al. | 73/204 |

FOREIGN PATENTS

| | | | |
|---|---|---|---|
| 1,238,716 | 7/1960 | France | 73/204 |
| 1,035,368 | 7/1966 | Great Britain | 73/204 |

Primary Examiner—Richard A. Gaudet
Assistant Examiner—Kyle L. Howell
Attorney—Christie, Parker and Hale ABSTRACT: A double lumen flowmeter catheter including two concentric lumens, the inner one of which extends beyond the anterior end of the outer one which is sealed at its anterior end to the inner lumen, defining a coolant flow passage therebetween. Means are coupled to the posterior end of the outer lumen for injecting coolant liquid into the flow passage, and exit means are provided from the passage adjacent its anterior end. A first electrical temperature sensing device is mounted adjacent the coolant exit means, but toward the posterior end of the outer lumen from the exit means, for sensing the temperature of liquid flowing through the passage toward the exit means, and a second electrical temperature sensing device is mounted to the inner lumen beyond the anterior end of the outer lumen for sensing the temperature of liquid flowing therepast.

PATENTED DEC 8 1970

3,545,428

INVENTOR.
WILTON W. WEBSTER, JR.
BY
Christie, Parker & Hale
ATTORNEYS

ପ3,545,428

MASSFLOWMETER CATHETER

CROSS REFERENCE TO RELATED APPLICATIONS

This application is a continuation-in-part of copending application Ser. No. 472,240 filed July 15, 1965, for BLOOD FLOW MEASURING APPARATUS, now U.S. Pat. No. 3,405,708.

FIELD OF THE INVENTION

This invention relates to blood massflow measurement apparatus and, more particularly, to a double lumen flowmeter catheter adapted for use with continuous flow thermal dilution techniques of measuring blood massflow.

BACKGROUND OF THE INVENTION

Thermal dilution techniques for measuring the massflow (volumetric flowrate rather than purely velocity flowrate) of blood in situ are known. According to these techniques, a known quantity of coolant liquid is injected into the blood stream and the temperature of the blood-coolant mixture is measured. If the temperature of the coolant, the mass of the coolant and the temperature of the blood before injection are known, the massflow of the blood can be determined from such data in conjunction with the value for the temperature of the blood-coolant mixture. Heretofore, blood massflow has been measured by thermal dilution techniques only on a pulsed basis, that is, a discrete known small quantity of coolant liquid at an allegedly known temperature was injected into the blood stream upstream, in terms of blood flow direction, from a temperature sensor disposed in a blood vessel. The output of the temperature sensor was monitored and the dip in blood temperature, produced as the small quantity of blood-coolant mixture flowed past the sensor, was monitored. Specifically, the area under a blood temperature-versus-time curve was integrated to obtain a figure of massflow for the blood.

One disadvantage of the pulse-oriented thermal dilution measurements of blood massflow is that the accuracy of such measurements is dependent upon there being a complete mixture of blood and coolant at the time the mixture flows past the temperature sensor. Previously available apparatus for carrying out thermal dilution blood flowrate measurements made it impossible to be sure that a proper mixture of blood and coolant existed in the blood stream adjacent the temperature sensor. Further, because prior thermal dilution techniques relied upon integration of the area under a temperature-versus-time curve, it was necessary that the temperature sensor have extremely fast response time. Temperature sensing devices sufficiently small to be used within a blood vessel do not have response times short enough to accord with the requirements of discontinuous flow thermal dilution techniques. Additionally, the temperature of the coolant liquid was monitored at a location remote from that at which the coolant was injected into the blood stream, with the result that some doubt always existed concerning the temperature of the coolant liquid actually injected into the blood stream.

SUMMARY OF THE INVENTION

This invention provides a blood massflowmeter catheter of novel configuration which may be used to advantage according to thermal dilution techniques carried out with continuous flow of the coolant liquid. That is, in use of the present catheter, coolant liquid is injected into the blood stream continuously at a uniform rate until the temperature of the coolant-blood mixture, as monitored by a temperature sensor, stabilizes at an essentially steady-state condition. The catheter enables the temperature of the coolant liquid actually injected into the blood stream to be known with precision. The catheter is structured so that a thorough mixture of coolant and blood exists at the time the coolant laden blood passes the location where the temperature of the mixture is measured. Moreover, the catheter is so arranged that the temperature sensors occupy known locations within the blood vessel and relative to each other, thereby producing a device susceptible of obtaining repeatable results.

Generally speaking, this invention provides a catheter for use in in situ measurement of blood massflowrate and the like. The catheter comprises an elongate flexible tube. A slender flexible probe is disposed within the tube and extends a selected distance beyond the one end of the tube. The probe has an outer diameter less than the inner diameter of the tube so that there results a liquid flow passage within the tube around the probe. Means are coupled to the other end of the tube for injecting a coolant liquid into the flow passage. Coolant exit aperture means are provided from the passage adjacent the one end of the tube. A first electrical temperature sensing device is mounted proximate the coolant exit aperture means but toward the other end of the tube from the aperture means. The first sensing device senses the temperature of coolant liquid flowing therepast and through the aperture means. A second electrical temperature sensing device is mounted to the probe beyond the one end of the tube for sensing the temperature of liquid flowing therepast.

DESCRIPTION OF THE DRAWINGS

The above-mentioned and other features of the invention are more fully set forth in the following description of a presently preferred device according to the invention, which description is presented with reference to the accompanying drawings, wherein.

DESCRIPTION OF A PREFERRED EMBODIMENT

Figure 1:
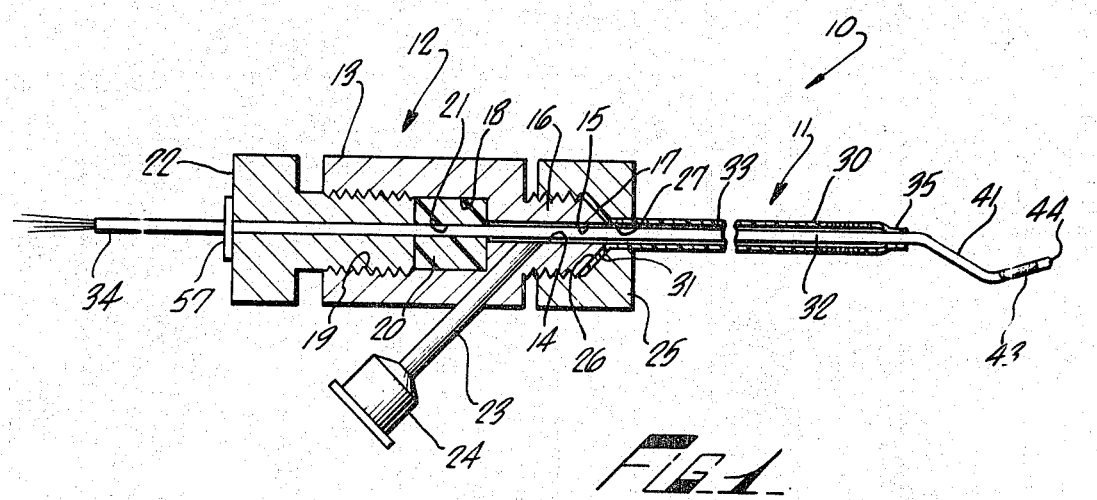
FIG. 1 is an enlarged cross-sectional elevation view of the catheter.

A blood massflow measuring device 10 shown in FIG. 1 includes a double lumen catheter 11 and a packing and injection fitting 12 connected to the posterior end of the catheter, that is, the end of the catheter which is not inserted into a patient's body. Fitting 12 includes a body 13 having an axial bore 14. The bore has a reduced diameter portion 15 extending through an externally threaded nipple 16 defined by the body. The surface of the nipple remote from the bulk of the body defines a conical surface 17 alined concentric to the axis of the bore and curved convex away from the body. Bore 14 also has an enlarged diameter portion 18, the end of which away from nipple 16 internally threaded as at 19. The section of bore enlarged diameter portion 18 adjacent bore minor diameter portion 15 defines a packing box within which is disposed a quantity of packing material 20, such as a quantity of sterilizable synthetic elastomeric material, having an axial bore 21 therethrough. An externally threaded, axially bored packing gland member 22 is engaged with the internal threads of body 13 so as to be axially movable relative to the body into and out of compressive engagement with packing material 20.

A tube 23 extends through fitting body 13 from communication with bore minor diameter portion 15 into communication with the interior of a receiving socket 24 for the barrel of a micrometer hypodermic syringe, for example.

Fitting 12 also includes an internally threaded clamp nut 25 which defines a conical surface 26 configured to mate with conical surface 17 on nipple 16. Surface 26 is disposed concentric to a hole 27 through the nut which is of larger diameter than the minor diameter portion of bore 14 and which communicates with the internally threaded portion of the nut.

It is preferred that all elements of the fitting be made of sterilizable materials.

Catheter 11 has an outer lumen 30 which is defined by a slender, elongate, flexible and yet inherently resilient tube, one end of which is flared, as at 31, circumferentially of the tube and is held securely between conical surfaces 17 and 26 of nipple 16 and nut 25, respectively. The catheter also has an inner lumen 32 which is defined by a slender, elongate, flexible and yet inherently resilient probe having a length greater than the length of the outer lumen. The outer diameter of probe 32 is less than the inner diameter of tube 30, with the results that along essentially the entire length of the tube there is provided an annular liquid flow passage 33 between the inner and outer lumens of the catheter; the passage extends within fitting 12 through nipple 16 to packing material 20. Probe 32, as shown in FIG. 1, is disposed essentially axially of the outer lumen and extends through packing material 20 and packing gland member 22 to its posterior end 34. The anterior end of tube 30, that is, the end of the tube remote from fitting 12 is necked down, as at 35, to provide an essentially fluid-tight sliding fit with the circumference of probe 32; this feature of the outer lumen is shown in greatest detail in FIG. 2.

In a presently preferred embodiment of this invention, the outer lumen of catheter 11 is formed of a length (say, 24 inches long) of thin walled polyethylene tubing having an inner diameter of about 0.038 inch. The inner lumen of the catheter is defined by a longer tube of tetrafluoroethylene having an outer diameter of about 0.030 inch. These materials are inherently resilient to the desired extent, inert in the presence of blood or other body fluids, and slide freely relative to each other. It should be understood, however, that materials other than polyethylene and tetrafluoroethylene may be used to advantage in the fabrication of catheter 11. Any material which has local resiliency and yet is easily deformable, and which is chemically inert in the presence of blood, may be used. Also, the material from which the probe in particular is made should be strong, soft, and flexible and a tube of such material should not expand diametrically when subjected to axially compressive loads.

Figure 2:
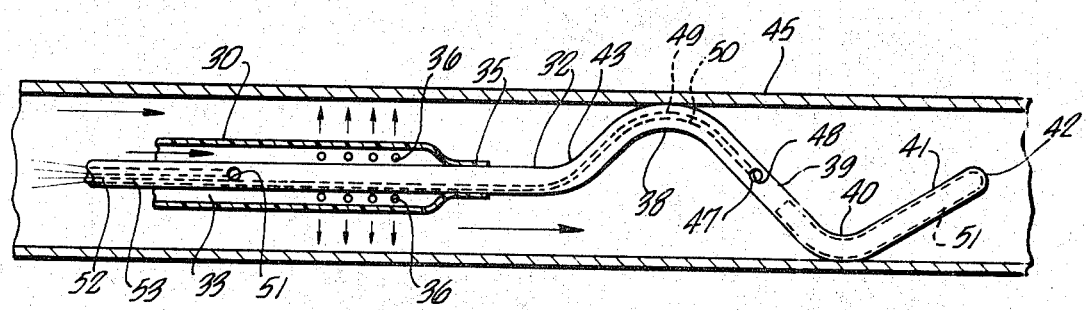
FIG. 2 is an enlarged cross-sectional elevation view of the catheter in place within a blood vessel.

Tube 23 and socket 24 are provided so that a coolant liquid may be injected into fluid flow passage 33. Coolant liquid is allowed to escape from the passage through a plurality of small diameter coolant exit apertures 36 formed through the walls of tube 30 adjacent reduced diameter tube neck 35. Apertures 36 are distributed, preferably uniformly, around the circumference of the tube, and also for a short distance along the length of the tube as shown in FIG. 2. Coolant discharge from the tube radially of the tube, as opposed to discharge axially of the tube, is preferred since a radial discharge pattern disrupts the normally laminar flow of blood along the tube and produces effective mixing of the coolant with the blood.

Outwardly of the anterior end of tube 30, probe 32 is formed to assume, when free of deforming loads, a double reverse bend curvature, shown best in FIG. 2. That is, outwardly of the outer lumen of the catheter, probe 32, when free of deforming loads, defines a bend 38 having an included angle of about 135° between the major portion of the length of the probe and a straight portion 39 which extends to a second bend 40. Bend 40 normally has an included angle of about 135° between straight portion 39 and a second terminal straight leg 41 which terminates at probe anterior end 42. When the probe is placed in a blood vessel, such as blood vessel 45, having a diameter less than the distance of the outside of bend 40 from a line between probe end 42 and the outside of bend 38 (this is the normal situation when the catheter is in use), probe 32 tends to bend as at 43; bend 43, however, is not biased into the material of the probe as are bends 38 and 40. Bends 38 and 40 are concave in opposite directions relative to the length of the probe.

The above-described double reverse bend curvature of the probe adjacent its anterior end provides a mechanism by which the anterior end of tube 30 is caused to be disposed essentially centrally of the cross-sectional area of blood vessel 45 when the catheter is disposed within the blood vessel, as by percutaneous insertion of the catheter into the blood vessel. The double reverse bend or S configuration of the anterior end of probe 32 is more fully described in the copending application identified above. In the present invention, this S-shaped configuration also assures the proper orientation of a blood temperature sensing device 47 carried by the probe relative to the walls of the blood vessel.

As shown in FIG. 2, an electrical temperature sensing device 47, preferably a thermistor, is mounted in probe 32 centrally of leg 39 between bends 38 and 40. It is preferred that the sensing devices used in catheter 11 have the characteristic that their impedance varies in relation to their temperature. The preferred sensing devices are thermistors which are very small devices made of semiconductor material and which have the characteristic that the logarithms of their resistivity vary substantially linearly as a function of temperature.

Thermistor 47 preferably is mounted adjacent the exterior of probe 32 snugly within a suitably sized hole 48 formed through the walls of the probe tube. Two electrical conductors 49 and 50 extend from the thermistor along the interior of the probe and outwardly from the posterior end of the probe. A second electrical temperature sensing device 51, namely a thermistor, is mounted to the probe proximate coolant exit apertures 36 (see FIG. 2) and just toward fitting 12 from the apertures. Sensing device 51 is mounted in the probe in essentially the same manner as sensing device 47 is mounted to the probe so that good thermal conduction is made between sensing device 51 and coolant liquid flowing through passage 33 toward apertures 36. Electrical conductors 52 and 53 extend along the probe from sensing device 51 and beyond the posterior end of the probe.

A length of lead or other X-ray opaque material 55 is disposed within probe 32 adjacent the anterior end of the probe, as shown in FIG. 2, to facilitate location of the probe within a blood vessel or the like by use of a fluoroscope.

Thermistors 47 and 51 are spaced along the length of the probe a known distance sufficient that, when probe 32 is oriented essentially as shown in FIG. 2 relative to the anterior end of tube 32, thermistor 51 is located close to, but just toward fitting 12 from apertures 36. A stop disk 57 is mounted to the probe adjacent its posterior end for abutment with the end of gland member 22 when thermistor 51 is disposed in the position shown in FIG. 2 relative to apertures 36. Inasmuch as the position of gland member 22 relative to body 13 is variable, depending upon the extent to which packing material 20 is compressed to provide a liquid-tight seal around the exterior of the probe, it is desirable that stop disk 57 be engaged in a sliding fit with the probe.

In use of massflowmeter device 10, catheter 11 is inserted into a blood vessel and moved along the blood vessel from the location of insertion to the desired location within the body where massflow measurements are to be made. Insertion of the catheter into the blood vessel may be accomplished by percutaneous techniques by means of a hypodermic needle or the like. It is desired that, prior to the insertion of the catheter into the blood vessel, flow passage 33 be filled to the greatest extent possible with a coolant liquid so that air bubbles are not subsequently injected into the blood stream. Also, prior to insertion of the catheter in the blood vessel, packing material 20 is compressed sufficiently around probe 32 to provide a fluid-tight seal at the posterior end of passage 33.

Once the probe is suitably located within the blood vessel, the temperature of blood flowing past sensing device 47 is obtained by means of this sensing device. This blood temperature, measured before commencement of injection of coolant liquid into the blood stream via apertures 36, becomes temperature $T_{B1}$ in the following expression which permits the computation of blood massflow:

$$F = -I(T_{B2} - T_I)K/(T_{B2} - T_{B1}).$$

where F is blood flow through the blood vessel in milligrams per minute, I is the flow in milligrams per minute of coolant liquid through apertures 36, $T_{B1}$ is the temperature of blood before the commencement of the injection of coolant liquid into the blood stream (reference blood temperature), $T_{B2}$ is the temperature of blood flowing past sensing device 47 following injection the coolant liquid into the blood upstream of sensing device 47, $T_I$ is the temperature of the coolant liquid injected into the blood stream as measured by sensing device 51, and K is the ratio of the specific heat of the coolant liquid relative to the specific heat of blood.

After a standard reference temperature of blood flowing past sensing device 47 has been obtained, the barrel of a hypodermic syringe, preferably a micrometer syringe, is engaged with socket 24 and the syringe is operated to inject coolant liquid into passage 33 at a predetermined rate. Such operation of the syringe causes the coolant liquid to be injected at the predetermined rate of into the blood stream upstream of sensing device 47. Inasmuch as apertures 36 are located upstream of sensing device 47 and the anterior end of the outer lumen of the catheter is disposed centrally of the blood vessel, complete mixture of the coolant liquid with the blood is possible by the time the blood flows past sensing device 47. Sensing device 47, therefore, measures the temperature of a thorough mixture of coolant liquid and blood. Sensing device 51, being located just immediately adjacent to and upstream of apertures 36, measures the temperature of the coolant liquid actually injected into the blood stream. Injection of coolant liquid at the predetermined rate into the blood stream is continued until steady state conditions are obtained at sensing device 47.

Figure 3:
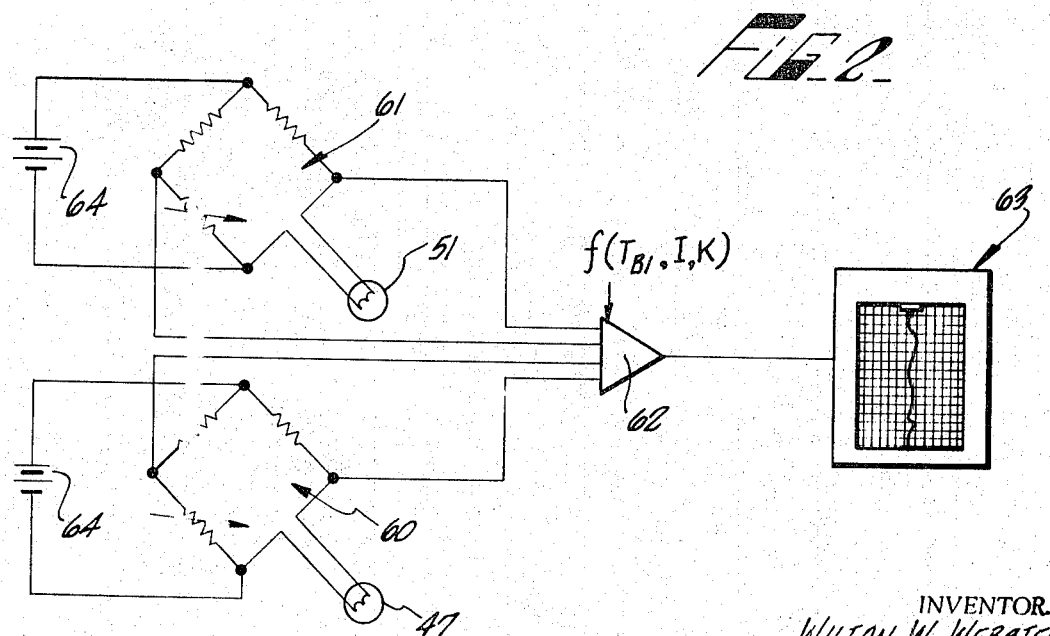
FIG. 3 is a schematic diagram of the instrumentation useful with the catheter shown in FIG. 1.

FIG. 3 illustrates, in schematic form, instrumentation which may be used to advantage in conjunction with massflowmeter 10 to provide a permanent record of blood massflowrate through a blood vessel. Each of thermistors 47 and 51 form one variable impedance leg of a respective one of a pair of Wheatstone bridge circuits 60 and 61 having batteries 64 impressed across their input terminals, the output terminals of which are coupled to an operational amplifier 62. The output of the amplifier is applied to the input terminals of a strip chart recorder 63. The operational amplifier operates on the outputs of the bridge circuits according to the expression set forth above; in this respect, an additional constant value parameter (a function of $T_{B1}$, I and K) is biased into the amplifier so that the output of the amplifier varies directly with the massflow of blood or a mixture of blood and coolant liquid past thermistor 47. For a given use of device 10, $T_{B2}$, I and K are known constants.

From the foregoing description, it will be seen that the present structure provides means whereby accurate determinations of blood flowrate may be obtained by continuous flow thermal dilution techniques. Because the anterior end of tube 30 is disposed centrally of the cross-sectional area of blood vessel 45, a complete mixture of blood and coolant liquid is obtained before this mixture passes temperature sensing device 47. The double reverse bend curvature of the anterior end of the probe assures that sensing device 47 is located centrally of the blood vessel wall rather than adjacent the walls of the vessel. Thus, the present structure makes it possible to obtain repeatable measurements of blood massflowrate, thereby making the catheter useful in clinical research.

I claim:

1. A catheter for use in in situ measurement of blood flowrate and the like comprising an elongate slender flexible tube, a slender flexible probe disposed within the tube and extending a selected distance beyond one end of the tube, the probe having an outer diameter sufficiently less than the inner diameter of the tube to provide a liquid flow passage within the tube around the probe, means coupled to the other end of the tube for injecting a coolant liquid into the flow passage, coolant exit aperture means from the passage adjacent the one end of the tube, a first electrical temperature sensing device mounted adjacent the coolant exit aperture means and toward the other end of the tube from the aperture means for sensing the temperature of coolant liquid flowing therepast, and a second electrical temperature sensing device mounted to the probe beyond the one end of the tube for sensing the temperature of liquid flowing therepast.

2. A catheter according to claim 1 wherein the temperature sensing devices are resistive devices.

3. A catheter according to claim 2 wherein the temperature sensing devices are thermistors.

4. A catheter according to claim 1 including means defining an a essentially liquid-tight seal between the one end of the tube and the exterior of the probe.

5. A catheter according to claim 1 wherein the coolant exit aperture means is arranged to discharge coolant from the passage radially of the tube.

6. A catheter according to claim 5 wherein the coolant exit aperture means comprises a plurality of apertures through the tube walls, the apertures being distributed substantially uniformly around the circumference of the tube.

7. A catheter according to claim 1 wherein the probe, outwardly of the one end of the tube, normally assumes a double reverse bend configuration and the second temperature sensing device is mounted midway between the bends of such configuration.

8. A catheter according to claim 1 including means outwardly of the one end of the tube for positioning the second temperature sensing device centrally of a blood vessel and the like into which the catheter may be inserted.

9. A catheter according to claim 1 wherein the means for injecting coolant liquid into the passage includes at least a part of a syringe.

10. A catheter according to claim 1 wherein the first temperature sensing device is mounted to the probe.

11. A a catheter according to claim 1 wherein the tube is fabricated of polyethylene and the probe is fabricated of tetrafluoroethylene.

12. Apparatus for use in in situ measurement of blood flowrate comprising a double lumen catheter including an elongate slender flexible tube sized to be disposed in a blood vessel without substantially restricting blood flow through the vessel externally of the tube and a flexible probe disposed within the tube and extending a selected distance beyond one end of the tube, the probe having an outer diameter sufficiently less than the inner diameter of the tube to provide a fluid flow passage within the tube externally of the probe, means coupled to the other end of the tube for injecting a coolant liquid into the flow passage at a predetermined rate, coolant exit aperture means from the passage adjacent the one end of the tube, a first thermistor mounted along the passage adjacent the coolant exit aperture means, a second thermistor mounted to the probe beyond the one end of the tube, means to which the thermistors are connected for producing a signal proportional to the temperature sensed by each thermistor, means for electrically evaluating the term $$IK(T_{B2}-T_I)/(T_{B2}-T_{B1})$$

wherein I is said predetermined coolant liquid flowrate, K is the ratio of the specific heat of the coolant liquid to the specific heat of blood, $T_{B1}$ is the temperature of blood measured by the second thermistor prior to injection of coolant liquid into the passage, $T_{B2}$ is the temperature of blood measured by the second thermistor during injection of coolant liquid into the passage, and $T_I$ is the temperature of the coolant liquid measured by the first thermistor, and means responsive to the evaluation of said term for producing a visual indication of the evaluation of the term.